United States Patent
Kim et al.

(10) Patent No.: US 8,608,620 B2
(45) Date of Patent: Dec. 17, 2013

(54) CONTROL METHOD OF ASSIST PUMP FOR AUTOMATIC TRANSMISSION OF VEHICLE PROVIDED WITH ISG SYSTEM

(75) Inventors: Sejun Kim, Seoul (KR); Soon Ae Gwon, Hwasung-si (KR); Jiyong Yu, Pocheon-si (KR); Jung-hwan Bang, Hwasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 376 days.

(21) Appl. No.: 13/182,664

(22) Filed: Jul. 14, 2011

(65) Prior Publication Data

US 2012/0148420 A1 Jun. 14, 2012

(30) Foreign Application Priority Data

Dec. 8, 2010 (KR) .................. 10-2010-0124919

(51) Int. Cl.
*F16H 61/26* (2006.01)

(52) U.S. Cl.
USPC ............................................ 477/156; 477/34

(58) Field of Classification Search
USPC .................... 477/34, 111, 112, 115, 156, 162
See application file for complete search history.

(56) References Cited

U.S. PATENT DOCUMENTS

| 8,112,208 | B2 * | 2/2012 | McGee et al. ............... 701/54 |
| 8,216,112 | B2 * | 7/2012 | Gibson et al. ............... 477/156 |
| 8,219,291 | B2 * | 7/2012 | Yabes et al. ............... 701/54 |
| 8,401,769 | B2 * | 3/2013 | Yu et al. ............... 701/112 |
| 8,529,403 | B2 * | 9/2013 | Nedorezov et al. ........... 477/115 |
| 2010/0143156 | A1 * | 6/2010 | Kong ............... 417/44.1 |

FOREIGN PATENT DOCUMENTS

| JP | 2002-130449 A | 5/2002 |
| JP | 3722083 B2 | 9/2005 |
| JP | 2008-240994 A | 10/2008 |
| KR | 10-0802672 B1 | 2/2008 |

\* cited by examiner

*Primary Examiner* — Justin Holmes
(74) *Attorney, Agent, or Firm* — Morgan, Lewis & Bockius LLP

(57) ABSTRACT

A control method of an assist pump for automatic transmission of a vehicle is provided with an ISG system. The control method includes executing idle stop and go, detecting present transmission gear shift and operating an assist hydraulic pump at a predetermined standard RPM according to detected present transmission gear shift. The control method may reduce electric power consumption and enhance battery durability and fuel efficiency.

7 Claims, 3 Drawing Sheets

CONTROL METHOD OF ASSIST PUMP FOR AUTOMATIC TRANSMISSION OF VEHICLE PROVIDED WITH ISG SYSTEM

CROSS-REFERENCE TO RELATED APPLICATION

This application claims priority to and the benefit of Korean Patent Application No. 10-2010-0124919 filed Dec. 8, 2010, the entire contents of which application is incorporated herein for all purposes by this reference.

BACKGROUND OF INVENTION

1. Field of Invention

The present invention relates to a control method of an assist pump for automatic transmission of a vehicle provided with an ISG system. More particularly, the present invention relates to a control method of an assist pump for automatic transmission of a vehicle provided with an ISG system which may reduce electric power consumption and enhance battery durability and fuel efficiency.

2. Description of Related Art

Since demand for low fuel consumption vehicles has been increase, an ISG (Idle Stop and Go) system is in the spotlight of consumers as enhancement of fuel consumption.

If a vehicle provided with the ISG system stops and predetermined conditions are satisfied, an engine stops so as to reduce fuel consumption in idle state. The ISG system determines whether an engine stops or not considering battery system information, engine and transmission system information driver's control will and so on.

In the case of an automatic transmission, when an engine stops, a hydraulic pump system does not operated. And thus if rapid restart after engine stops is required, hydraulic pressure is not generated so that shock may occur. And thus generally an assist hydraulic pump is provided to a vehicle with an automatic transmission to maintain hydraulic pressure within the transmission.

In the case of a general ISG system for an automatic transmission, when an engine stops, an assist hydraulic pump of a transmission is operated, and when an engine re-starting is completed, operation of the assist hydraulic pump stops.

Flux supplied by the assist hydraulic pump is controlled according to the revolutions per minute RPM of the assist hydraulic pump, and an ECU (engine control unit) receives temperature signal of transmission oil and determines RPM based on one-dimensional table and then the ECU transmits CAN signal to an inverter of the assist hydraulic pump to control the assist hydraulic pump.

In the case of a general control method of a transmission assist hydraulic pump, if an engine stops, the transmission assist hydraulic pump is operated according to transmission oil temperature regardless of gear shift and engine stop period, and thus generated hydraulic pressure is more than necessary.

And also, when the assist hydraulic pump is operated and the engine stops, generation of electricity does not executed, and thus excessive load is applied to a battery and durability of the battery may be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a control method of an assist pump for automatic transmission of a vehicle provided with an ISG system having advantages of reducing electric power consumption and enhancing battery durability and fuel efficiency.

A control method of an assist pump for automatic transmission of a vehicle provided with an ISG system according to various aspects of the present invention, the control method may include executing idle stop and go, detecting present transmission gear shift and operating an assist hydraulic pump at a predetermined standard RPM according to detected present transmission gear shift.

The predetermined standard RPM according to the detected present transmission gear shift may include a P-shift standard RPM, a N-shift standard RPM and a D-shift standard RPM, wherein values of the P-shift standard RPM, the N-shift standard RPM and the D-shift standard RPM may be increased in series.

The operating an assist hydraulic pump at a predetermined standard RPM according to the detected present transmission gear shift may include a low RPM operating step to operate the assist pump at low RPM during a predetermined period and a high RPM operating step to operate the assist pump at high RPM after the low RPM operating step.

The low RPM operating step may include a P-shift standard low RPM, a N-shift standard low RPM and a D-shift standard low RPM, wherein values of the P-shift standard low RPM, the N-shift standard low RPM and the D-shift standard low RPM is increased in series.

The high RPM operating step may include a P-shift standard high RPM, a N-shift standard high RPM and a D-shift standard high RPM, wherein values of the P-shift standard high RPM, the N-shift standard high RPM and the D-shift standard high low RPM is increased in series.

The low RPM operating step may include a P-shift standard low RPM, a N-shift standard low RPM and a D-shift standard low RPM, wherein values of the P-shift standard low RPM, the N-shift standard low RPM and the D-shift standard low RPM is increased in series, and the high RPM operating step may include a P-shift standard high RPM, a N-shift standard high RPM and a D-shift standard high RPM, wherein values of the P-shift standard high RPM, the N-shift standard high RPM and the D-shift standard high low RPM is increased in series.

The values of the P-shift standard low RPM and the P-shift standard high RPM may be the same.

The control method of an assist pump for automatic transmission of a vehicle provided with an ISG system according to various aspects of the present invention may reduce electric power consumption and enhance battery durability and fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
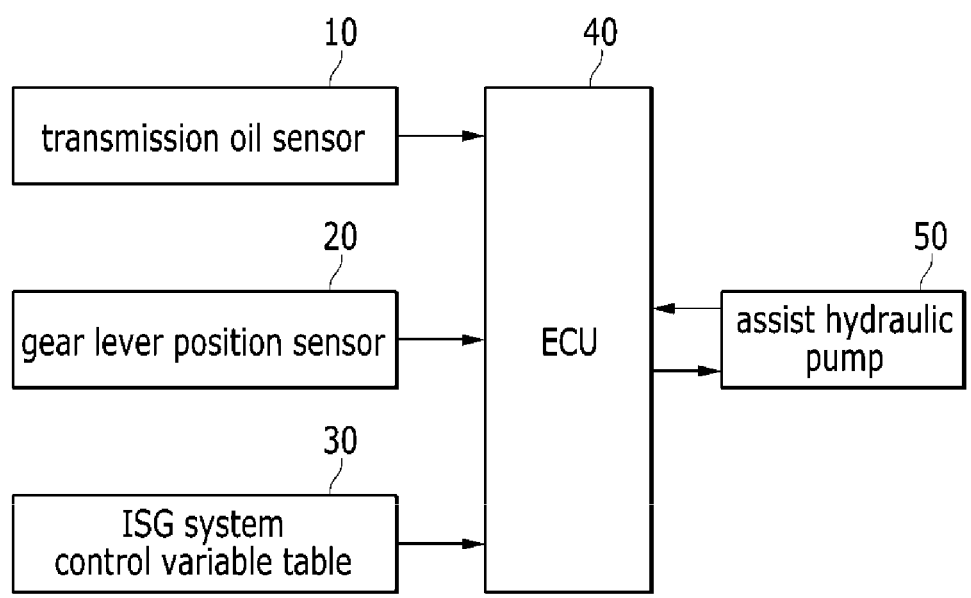
FIG. 1 is a schematic diagram of an exemplary idle stop and go system according to the present invention.

Referring to FIG. 1, an idle stop and go system (ISG system) according to various embodiments of the present invention includes an assist hydraulic pump 50 generating hydraulic pressure within an automatic transmission, an ECU (engine control unit) 40 controlling the assist hydraulic pump 50, a transmission oil sensor 10 detecting oil temperature of the transmission, a gear lever position sensor 20 detecting present gear shift, and an ISG system control variable table 30 for operating the ISG system and for controlling the ISG system and the ISG system control variable table 30 includes sensors information, predetermined revolutions per minute RPM maps, timer and so on.

Figure 2:
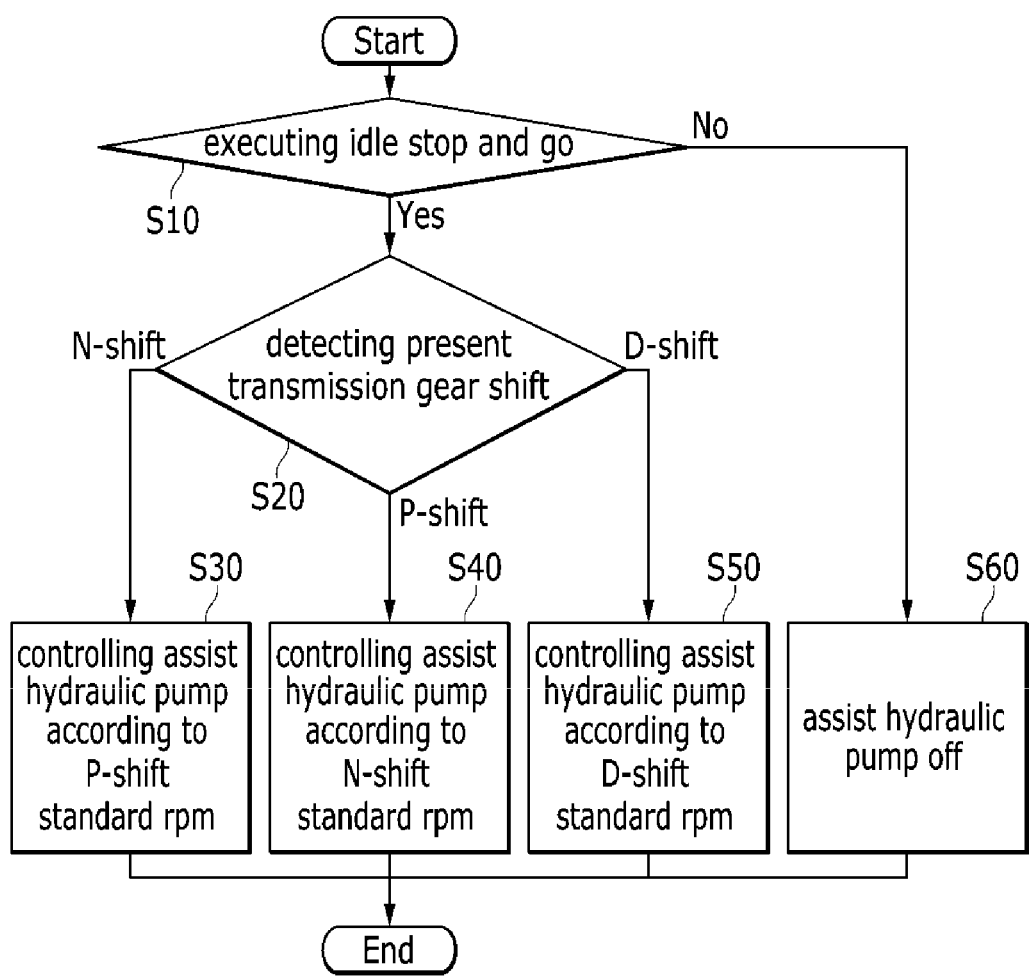
FIG. 2 is a control flowchart of an exemplary idle stop and go system according to the present invention.

Referring to FIG. 2, a control method of the assist pump 50 for an automatic transmission of a vehicle provided with the ISG system according to various embodiments of the present invention, the control method includes executing idle stop and go (S10), detecting present transmission gear shift (S20) and operating the assist hydraulic pump 50 at a predetermined standard RPM according to detected present transmission gear shift (S30, S40 and S50).

The predetermined standard RPM according to the detected present transmission gear shift includes a P-shift standard RPM, a N-shift standard RPM and a D-shift standard RPM.

Herein, the D-shift includes driving shifts except for the P-shift and the N-shift.

Figure 3:
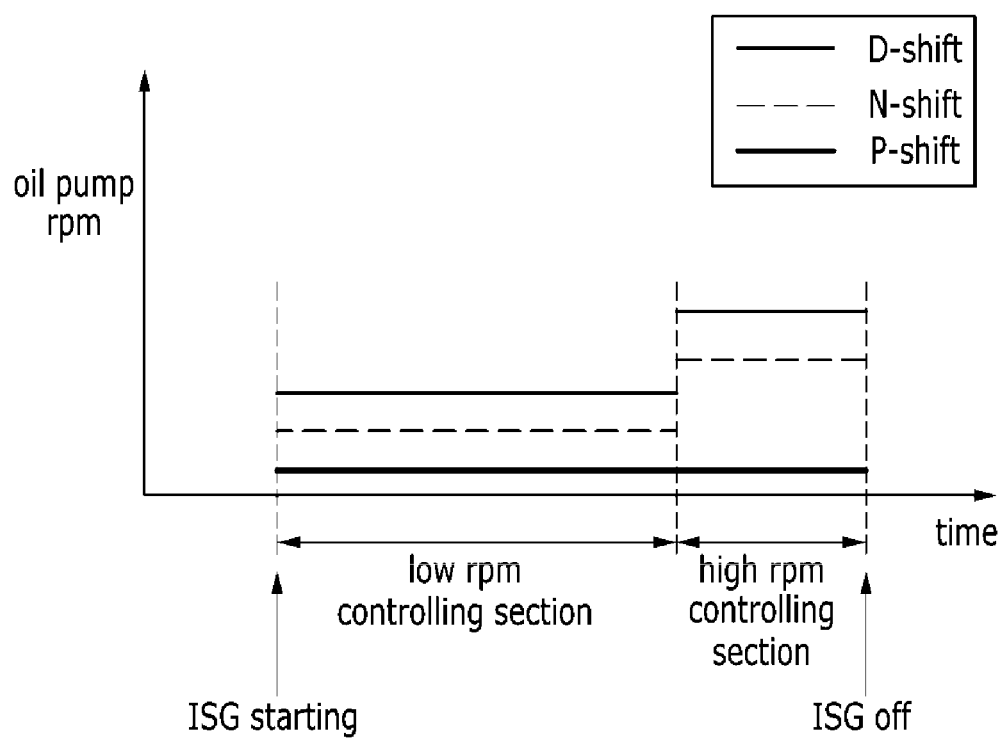
FIG. 3 is a graph of hydraulic pump RPM of an exemplary idle stop and go system according to the present invention.

Referring to FIG. 3, values of the P-shift standard RPM, the N-shift standard RPM and the D-shift standard RPM is increased in series.

And thus, the predetermined standard RPM of each shift for driving the assist hydraulic pump 50 are vary according to required hydraulic pressure of each shift and thus load applied to a battery may be reduced and consumption of electric power of the battery may be reduced.

The operating an assist hydraulic pump at a predetermined standard RPM according to the detected present transmission gear shift (S30, S40, and S50) includes a low RPM operating step to operate the assist pump 50 at low RPM during a predetermined period and a high RPM operating step to operate the assist pump 50 at high RPM after the low RPM operating step.

The low RPM operating step includes a P-shift standard low RPM, a N-shift standard low RPM and a D-shift standard low RPM, wherein values of the P-shift standard low RPM, the N-shift standard low RPM and the D-shift standard low RPM is increased in series.

The high RPM operating step includes a P-shift standard high RPM, a N-shift standard high RPM and a D-shift standard high RPM, wherein values of the P-shift standard high RPM, the N-shift standard high RPM and the D-shift standard high low RPM is increased in series.

That is, as shown in FIG. 2 and FIG. 3, according to the control method of the assist pump 50 for an automatic transmission of a vehicle provided with the ISG system of various embodiments of the present invention, after starting the ISG control, the vehicle is not expected to operate during some interval, and thus considering those, the assist pump 50 is operated at the predetermined low RPM during the predetermined period and then the assist pump 50 is operated at the predetermined high RPM before expected engine re-starting. And thus load applied to the assist pump 50 may be reduced and consumption of electric power of the battery may be reduced.

In this case, the predetermined period may be determined considering driver's driving habit, traffic condition and so on.

The values of the P-shift standard low RPM and the P-shift standard high RPM may be the same.

In the case of the P-shift, it may be expected for the vehicle to drive immediately after releasing the ISG control, and thus the values of the P-shift standard low RPM and the P-shift standard high RPM may be the same.

The low standard RPM and the high standard RPM of each shift may be determined by experiments considering required hydraulic pressure of the automatic transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments ere chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of an assist pump for automatic transmission of a vehicle provided with an idle stop and go (ISG) system, the control method comprising:
   executing idle stop and go;
   detecting the present transmission gear shift; and
   operating an assist hydraulic pump at a predetermined standard revolutions per minute RPM according to the detected present transmission gear shift.

2. The control method of claim 1, wherein the predetermined standard RPM according to the detected present transmission gear shift comprises a P-shift standard RPM, a N-shift standard RPM and a D-shift standard RPM,
   wherein values of the P-shift standard RPM, the N-shift standard RPM and the D-shift standard RPM is increased in series.

3. The control method of claim 1, wherein the operating an assist hydraulic pump at a predetermined standard RPM according to the detected present transmission gear shift comprises:
   a low RPM operating step to operate the assist pump at low RPM during a predetermined period; and
   a high RPM operating step to operate the assist pump at high RPM after the low RPM operating step.

4. The control method of claim 3, wherein the low RPM operating step comprises a P-shift standard low RPM, a N-shift standard low RPM and a D-shift standard low RPM, wherein values of the P-shift standard low RPM, the N-shift standard low RPM and the D-shift standard low RPM is increased in series.

5. The control method of claim 3, wherein the high RPM operating step comprises a P-shift standard high RPM, a N-shift standard high RPM and a D-shift standard high RPM,
wherein values of the P-shift standard high RPM, the N-shift standard high RPM and the D-shift standard high low RPM is increased in series.

6. The control method of claim 3, wherein:
the low RPM operating step comprises a P-shift standard low RPM, a N-shift standard low RPM and a D-shift standard low RPM,
wherein values of the P-shift standard low RPM, the N-shift standard low RPM and the D-shift standard low RPM is increased in series, and
the high RPM operating step comprises a P-shift standard high RPM, a N-shift standard high RPM and a D-shift standard high RPM,
wherein values of the P-shift standard high RPM, the N-shift standard high RPM and the D-shift standard high low RPM is increased in series.

7. The control method of claim 6, wherein the values of the P-shift standard low RPM and the P-shift standard high RPM are the same.

* * * * *